United States Patent
Tanizaki et al.

(10) Patent No.: US 7,309,545 B2
(45) Date of Patent: Dec. 18, 2007

(54) ANODE MATERIAL AND BATTERY USING THE SAME

(75) Inventors: Hiroaki Tanizaki, Miyagi (JP); Atsuo Omaru, Fukushima (JP)

(73) Assignee: Sony Corporation, Tokyo (JP)

( * ) Notice: Subject to any disclaimer, the term of this patent is extended or adjusted under 35 U.S.C. 154(b) by 306 days.

(21) Appl. No.: 10/664,683

(22) Filed: Sep. 18, 2003

(65) Prior Publication Data

US 2004/0053131 A1    Mar. 18, 2004

(30) Foreign Application Priority Data

Sep. 18, 2002    (JP) ............................ P2002-271710

(51) Int. Cl.
*H01M 4/58* (2006.01)
(52) U.S. Cl. ............... 429/218.1; 429/231.1; 429/232; 429/231.8; 252/182.1
(58) Field of Classification Search ............. 429/218.1, 429/231.1, 232, 231.8; 252/182.1
See application file for complete search history.

(56) References Cited

U.S. PATENT DOCUMENTS

| | | | | |
|---|---|---|---|---|
| 6,265,111 B1 * | 7/2001 | Bito et al. | ................ | 429/218.1 |
| 6,730,429 B2 * | 5/2004 | Thackeray et al. | ......... | 429/220 |
| 2004/0023119 A1 * | 2/2004 | Mizutani et al. | ............ | 429/245 |

FOREIGN PATENT DOCUMENTS

JP    2001-143701    *    5/2001

* cited by examiner

*Primary Examiner*—Laura Weiner
(74) *Attorney, Agent, or Firm*—Sonnenschein Nath & Rosenthal LLP

(57) ABSTRACT

Provided is a battery with a higher capacity and superior charge-discharge cycle characteristics. A cathode contained in a package can and an anode contained in a package cup are laminated with a separator in between. The separator is impregnated with an electrolyte solution formed by dissolving lithium salt in a solvent. The anode comprises a tin-containing material including metallic tin and an intermetallic compound including tin in the same particle. A higher capacity and superior charge-discharge cycles can be obtained by the tin-containing material.

9 Claims, 1 Drawing Sheet

ANODE MATERIAL AND BATTERY USING THE SAME

BACKGROUND OF THE INVENTION

1. Field of the Invention

The present invention relates to an anode material including tin and a battery using the anode material.

2. Description of the Related Art

In recent years, portable electronic devices such as cellular phones, camera/VTR (video tape recorder) combination systems, laptop computers or the like have come into widespread, and a reduction in size and weight of the devices have been strongly required. Accordingly, as portable power sources for the devices, research and development aimed at improving the energy density of batteries, specifically secondary batteries have been actively promoted. Among the batteries, lithium-ion secondary batteries hold great promise, because the lithium-ion secondary batteries can obtain a higher energy density than lead-acid batteries or nickel-cadmium batteries which are conventional aqueous electrolyte secondary batteries.

Conventionally, as an anode material of the lithium-ion secondary battery, a carbonaceous material such as non-graphitizable carbon, graphite or the like is widely used, because the carbonaceous material exhibits a relatively high capacity and excellent charge-discharge cycle characteristics.

However, in accordance with a recent trend toward a higher capacity, an anode is required to have a further higher capacity, so research and development has been promoted. For example, an anode including a carbonaceous material has achieved a higher capacity by selecting the carbonaceous material and a forming method (refer to Japanese Unexamined Patent Application Publication No. Hei 8-315825). However, the anode has a discharge potential of 0.8V to 1.0 V against lithium, so when a battery is formed using the anode, the battery discharge voltage becomes lower. Therefore, a significant improvement in a battery energy density is not expected. Further, there are disadvantages that a hysteresis in charge-discharge curves is large, and energy efficiency in each charge-discharge cycle is low.

On the other hand, as an anode material capable of achieving a higher capacity, for example, a material adapting a property of reversibly producing and decomposing some kind of lithium metal by an electrochemical reaction. More specifically, as such a material, a Li—Al alloy has been known since long ago. Further, a Si alloy has been reported (refer to U.S. Pat. No. 4,950,566).

However, these anode materials such as these alloys are expanded or shrunk in accordance with charge and discharge, thereby resulting in the materials being pulverized, so the cycle characteristics of the battery declines.

Therefore, in order to improve the charge-discharge cycle characteristics, an anode material in which an element not involved in expansion and shrinkage in accordance with insertion and extraction of lithium is substituted for a part has been studied. For example, $LiSi_aO_b$ ($0 \leq a$, $0<b<2$) (refer to Japanese Unexamined Patent Application Publication No. Hei 6-325765), $Li_cSi_{1-d}M_dO_e$ (M represents metal except for alkali metal or metalloid except for silicon; $0 \leq c$, $0<d<1$, $0<e<2$) (refer to Japanese Unexamined Patent Application Publication No. Hei 7-230800), and a Li—Ag—Te alloy (refer to Japanese Unexamined Patent Application Publication No. Hei 7-288130) have been invented.

However, even if any of these anode materials is used, a decline in the cycle characteristics resulting from expansion and shrinkage of the alloys is large, so the fact is that full advantage cannot be taken of a higher capacity.

Moreover, D. Larcher et al. has proposed $Cu_6Sn_5$ which is an intermetallic compound as an anode material capable of achieving a higher capacity. However, in $Cu_6Sn_5$, a large decline in the charge-discharge cycle characteristics is still observed.

SUMMARY OF THE INVENTION

In view of the foregoing, it is an object of the invention to provide an anode material capable of obtaining a higher capacity and superior charge-discharge cycle characteristics, and a battery using the anode material.

An anode material according to the invention comprises a tin-containing material including metallic tin (Sn) and an intermetallic compound including tin in the same particle.

A battery according to the invention comprises a cathode, an anode, and an electrolyte, wherein the anode comprises a tin-containing material including metallic tin and an intermetallic compound including tin in the same particle.

In the anode material according to the invention, by the tin-containing material including metallic tin and an intermetallic compound including tin in the same particle, a capacity and charge-discharge cycle characteristics can be improved.

In the battery according to the invention, the anode material according to the invention is used, so a higher capacity and superior charge-discharge cycle characteristics can be obtained.

Other and further objects, features and advantages of the invention will appear more fully from the following description.

DETAILED DESCRIPTION OF THE PREFERRED EMBODIMENTS

Figure 1:
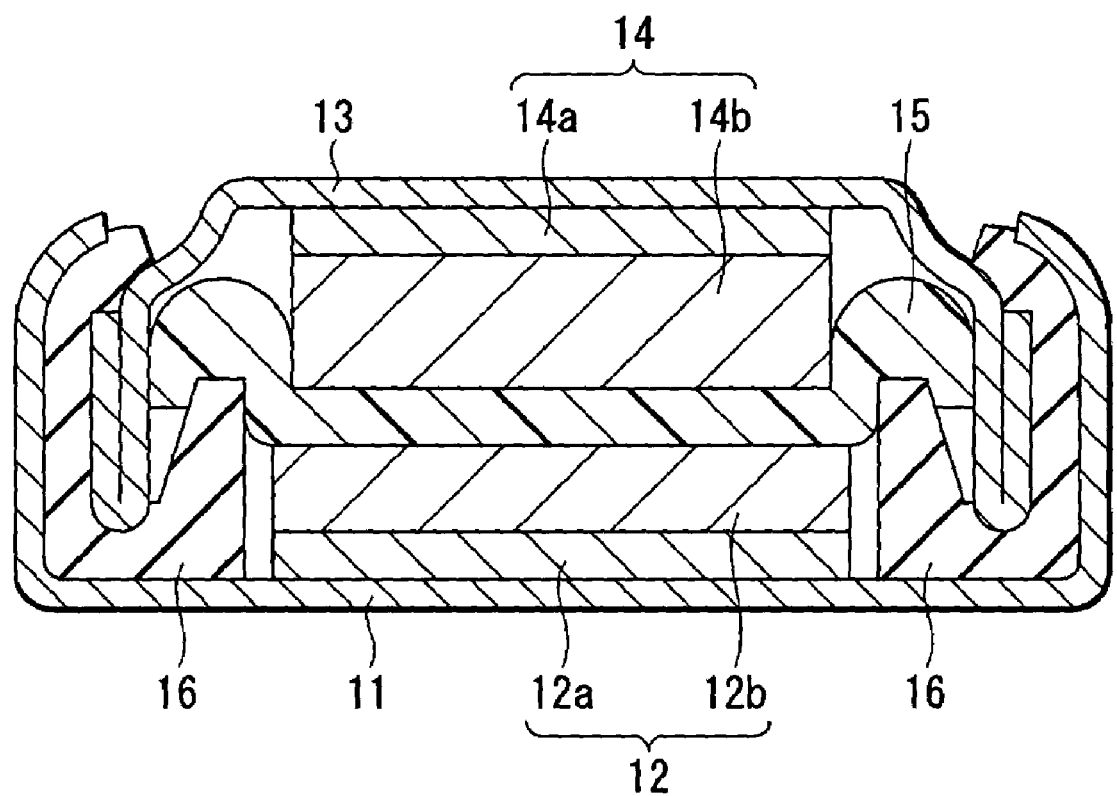
FIG. 1 is a sectional view of a secondary battery using an anode material according to an embodiment of the invention.

Preferred embodiments of the invention will be described in more detail below referring to the accompanying drawings.

An anode material according to an embodiment of the invention comprises a tin-containing material including metallic tin and an intermetallic compound including tin in the same particle, because by the tin-containing material, a capacity can become higher, and charge-discharge cycle characteristics can be improved. A chemical formula of the intermetallic compound including tin is represented by, for example, Chemical Formula 1. Herein, the intermetallic compound includes not only a compound including two or more kinds of metal elements but also a compound including one or more kinds of metal elements and one or more kinds of metalloid elements.

[Chemical Formula 1]

$Sn_yMI_x$.

In Chemical Formula 1, MI represents at least one kind selected from elements capable of forming an intermetallic compound with tin. The value of x is within a range of $0.1 \leq x \leq 6$. The value of y is 1, 2, or 5.

The intermetallic compound preferably includes copper (Cu), iron (Fe) or cobalt (Co), because the charge-discharge cycle characteristics can be further improved, and a decline in a charge-discharge capacity when charge and discharge are carried out at a large current can be inhibited.

More specifically, as such an intermetallic compound, $Cu_3Sn$, $Cu_6Sn_5$, $FeSn$, $FeSn_2$, $CoSn$, $CoSn_2$ or $Co_3Sn_2$ is cited.

The tin-containing material may include any other metal or any other alloy in addition to metallic tin and the intermetallic compound including tin. As the metal or the alloy, for example, at least one kind selected from the group consisting of metal elements and metalloid elements capable of forming an alloy with lithium and alloys thereof is preferable. Further, the alloys includes not only an alloy of two or more kinds of metal elements but also an alloy of one or more kinds of metal elements and one or more kinds of metalloid elements. As the composition of the alloy, a solid solution, a eutectic (eutectic mixture), an intermetallic compound or the coexistence of two or more kinds selected from them is cited.

As the metal elements and the metalloid elements capable of forming an alloy with lithium, for example, magnesium (Mg), boron (B), aluminum (Al), gallium (Ga), indium (In), silicon (Si), germanium (Ge), tin, lead (Pb), antimony (Sb), bismuth (Bi), cadmium (Cd), silver (Ag), zinc (Zn), hafnium (Hf), zirconium (Zr) and yttrium (Y) are cited.

As the alloys thereof, for example, an alloy represented by a chemical formula $Ma_sMb_tLi_u$ is cited. In the chemical formula, Ma represents at least one kind selected from the group consisting of metal elements and metalloid elements capable of forming an alloy with lithium, and Mb represents at least one kind selected from the group consisting of metal elements and metalloid elements except for lithium and Ma. The values of s, t and u are within a range of $s>0$, $t \geq 0$ and $u \geq 0$, respectively.

As specific examples, a LiAl alloy, a LiAlMII alloy (MII represents at least one kind selected from the group consisting of Group 2A elements, Group 3B elements, Group 4B elements and transition metal elements), AlSb and CuMgSb are cited.

The tin-containing material may further include a single substance or an alloy of a metal element or a metalloid element incapable of forming an alloy with lithium, and a nonmetal element.

A method of forming such a tin-containing material is not limited, and, for example, a mechanical alloying method, a gas atomization method, a water atomization method, a melt spinning method, and a method of mixing materials, then heating the mixed materials in an inert atmosphere or a reducing atmosphere are cited.

The anode material preferably comprises a carbonaceous material in addition to the tin-containing material. It is because conductivity can be improved by the carbonaceous material. Further, the carbonaceous material can insert and extract lithium or the like, so the carbonaceous material functions as not only an electronic conductor but also an anode active material, thereby the capacity can be further improved, and the cycle characteristics are superior.

As the carbonaceous material, for example, non-graphitizable carbon, artificial graphite, natural graphite, kinds of pyrolytic carbon, kinds of coke (pitch coke, needle coke, petroleum coke or the like), kinds of graphite, kinds of glass-like carbon, a sintered high molecular weight organic compound body (a phenolic resin, a furan resin or the like carbonized through sintering at an adequate temperature), carbon fiber, activated carbon, and any other kinds of carbon black are cited. Further, the anode material may include a material not contributing to charge and discharge.

For example, the anode material is used for an anode of the following secondary battery.

FIG. 1 shows a sectional view of a secondary battery using the anode material according to the embodiment. The secondary battery is a so-called coin type, and comprises a laminate including a disk-shaped cathode 12 contained in a package can 11 and a disk-shaped anode 14 contained in a package cup 13 with a separator 15 in between. Edge portions of the package can 11 and the package cup 13 are sealed through caulking by a gasket 16.

The package can 11 and the package cup 13 are made of, for example, metal such as stainless, aluminum (Al) or the like.

The cathode 12 includes, for example, a cathode current collector 12a and a cathode mixed layer 12b disposed on the cathode current collector 12a. The cathode current collector 12a is made of, for example, metal foil such as aluminum foil, nickel (Ni) foil, stainless foil or the like. The cathode mixed layer 12b includes, for example, a cathode material capable of inserting and extracting lithium, and if necessary, an electronic conductor such as carbon black, graphite or the like, and a binder such as polyvinylidene fluoride or the like. As the cathode material capable of inserting and extracting lithium, for example, metal oxide, metal sulfide or a specific high molecular weight material is cited, and one kind or a mixture of two or more kinds selected from them is used.

As the metal oxide, lithium complex oxide or $V_2O_5$ is cited. Specifically, the lithium complex oxide is preferable, because the lithium complex oxide can generate a high voltage, and are superior in energy density. The lithium complex oxide is represented by, for example, a chemical formula $Li_xMcO_2$. In the formula, Mc represents one or more kinds of transition metal elements, and preferably at least one kind selected from the group consisting of cobalt, nickel and manganese (Mn). The value of x depends upon charge-discharge conditions of the battery, and is generally within a range of $0.05 \leq y \leq 1.10$. More specifically, as such lithium complex oxide, $LiCO_2$, $LiNiO_2$, $Li_vNi_wCo_{1-w}O_2$ (the values of v and w depend upon charge-discharge conditions of the battery, and are generally within a range of $0<v<1$ and $0.7<w<1.02$, respectively), lithium manganese complex oxide having a spinel structure, or the like is cited.

As the metal sulfide, $TiS_2$, $MoS_2$, or the like is cited, and as the high molecular weight material, polyacetylene, polypyrrole or the like is cited. Further, in addition to these cathode materials, $NbSe_2$ or the like may be used.

The anode 14 includes, for example, an anode current collector 14a and an anode mixed layer 14b disposed on the anode current collector 14a. The anode current collector 14a is made of, for example, metal foil such as copper foil, nickel foil, stainless foil or the like. The anode mixed layer 14b includes the anode material according to the embodiment. In other words, the anode mixed layer 14b includes the tin-containing material which includes metallic tin and the intermetallic compound including tin in the same particle, and the anode mixed layer 14b preferably includes the carbonaceous material as the anode active material and the electronic conductor. The anode mixed layer 14b may further include, if necessary, an electronic conductor such as a carbonaceous material, metallic powder, conductive polymer or the like, and a binder such as polyvinylidene fluoride.

Moreover, insertion of lithium into the above-described cathode 12 and the above-described anode 14 may be electrochemically carried out during a manufacturing process of the cathode 12, the anode 14 or the battery.

The separator 15 isolates between the cathode 12 and the anode 14 so as to pass lithium ions through while preventing a short circuit of a current due to the contact between the cathode 22 and the anode 24. The separator 15 is made of, for example, a porous film made of a synthetic resin such as polytetrafluoroethylene, polypropylene, polyethylene or the like, or a porous film made of an inorganic material such as nonwoven fabric made of a ceramic, and may comprise a laminate including two or more kinds selected from these porous films.

The separator 15 is impregnated with an electrolyte solution which is a liquid electrolyte. The electrolyte solution includes, for example, a solvent and lithium salt which is electrolyte salt dissolved in the solvent. As the solvent, for example, propylene carbonate, ethylene carbonate, diethyl carbonate, dimethyl carbonate, 1,2-dimethoxyethane, 1,2-diethoxyethane, γ-butyrolactone, tetrahydrofuran, 2-methyltetrahydrofuran, 1,3-dioxolane, 4-methyl-1,3-dioxolane, diethyl ether, sulfolane, methylsulfolane, acetonitrile, propionitrile, anisole, acetate, butyrate or propionate is cited, and one kind or a mixture of two or more kinds selected from them is used.

As the lithium salt, for example, $LiClO_4$, $LiAsF_6$, $LiPF_6$, $LiBF_4$, $LiB(C_6H_5)_4$, $CH_3SO_3Li$, $CF_3SO_3Li$, $LiCl$ or $LiBr$ is suitable, and one kind or a mixture of two or more kinds selected from them is used.

The secondary battery can be manufactured through the following steps.

At first, for example, the cathode material capable of inserting and extracting lithium, the electronic conductor and the binder are mixed to prepare a cathode mixture, then the cathode mixture is dispersed in a solvent such as N-methyl-2-pyrrolidone or the like to form cathode mixture slurry. Next, after the cathode mixture slurry is applied to the cathode current collector 12a, and is dried, the cathode mixed layer 12b is formed through compression molding, and the cathode current collector 12a on which the cathode mixed layer 12b is formed is stamped into a predetermined shape so as to form the cathode 12.

Next, for example, the anode material and the binder, and if necessary, the electronic conductor are mixed to prepare an anode mixture, then the anode mixture is dispersed in a solvent such as N-methyl-2-pyrrolidone or the like to form anode mixture slurry. Next, after the anode mixture slurry is applied to the anode current collector 14a, and is dried, the anode mixed layer 14b is formed through compression molding, and the anode current collector 14a on which the anode mixed layer 14b is formed is stamped into a predetermined shape so as to form the anode 14.

After that, for example, the anode 14, the separator 15 impregnated with the electrolyte solution, and the cathode 12 are laminated, and are contained in the package cup 13 and the package can 11, then the package cup 13 and the package can 11 are caulked. Thereby, the secondary battery shown in FIG. 1 is completed.

The secondary battery works as follows.

In the secondary battery, when charge is carried out, lithium ions are extracted from the cathode 12, and are inserted into the anode 14 through the electrolyte solution. On the other hand, when discharge is carried out, for example, lithium ions are extracted from the anode 14, and are inserted into the cathode 12 through the electrolyte solution. Herein, the anode 14 includes the anode material according to the embodiment, so a higher capacity and superior charge-discharge cycle characteristics can be obtained.

Thus, the anode material according to the embodiment comprises the tin-containing material including metallic tin and the intermetallic compound including tin in the same particle, so the capacity can be increased, and the charge-discharge cycle characteristics can be improved. Therefore, when the anode material is used, the secondary battery having a higher capacity and superior charge-discharge cycle characteristics can be obtained.

Specifically, when the carbonaceous material is included in addition to the tin-containing material, a further higher capacity and superior conductivity can be obtained.

Moreover, when the cathode 12 including the lithium complex oxide is used, a higher voltage can be generated, and the energy density can be improved.

EXAMPLES

Next, specific examples of the invention will be described in detail below.

Examples 1 through 14

At first, a thin piece made of an alloy was obtained by a melt spinning method, that is, preparing tin and, copper, iron or cobalt as materials, dissolving them in a high-frequency furnace in an argon (AR) gas atmosphere by using a liquid quenching apparatus RQM-T-50 manufactured by Kabushiki kaisha Makabe Giken, and dropping them on a copper roll at a peripheral speed of 3000 m/min. At that time, the mixed ratio of the materials was as shown in Tables 1 through 3. Next, regarding to Examples 3, 9 and 14, after the thin piece was heated for 10 hours at 200° C. in an argon gas atmosphere, the temperature was reduced to an ambient temperature in one hour to adjust the composition of the thin piece. Next, after the thin piece was reheated to a temperature of 50° C. lower than the melting point of each alloy, the thin piece was put into a cooling apparatus in which cooling water was passed through a container to be cooled down to a room temperature. After that, the thin piece was pulverized by using a vibration mini-cup mill MC-4A manufactured by Itou Seisakusho to obtain powder with an average particle diameter of 15 μm. When the structure of the obtained powder was analyzed by using a powder X-ray diffractometer Geiger-Flex RAD-IIC manufactured by Rigaku, materials shown in Tables 1 through 3 were observed. In Tables 1 through 3, the observed material was marked with ◯, and the material not observed was marked with X. Moreover, the powder was analyzed by a particle analyzer PT1000 manufactured by Yokogawa Electric Corporation, the concentration ratio of copper, iron or cobalt to tin in each particle was substantially the same, so it was confirmed that it was not a particle of metallic tin. In other words, it was confirmed that the obtained powder was a tin-containing material including the materials shown in Tables 1 through 3 in the same particle. In Table 4, the JCPDS (Joint Committee of Powder Diffraction Standard; powder X-ray diffraction standard data) numbers of the observed materials were shown.

TABLE 1

| | MATERIAL | | HEAT TREATMENT IN Ar GAS | PHASE INCLUDED IN ONE PARTICLE | | | RATIO OF ARTIFICIAL GRAPHITE IN ANODE MATERIAL | DISCHARGE CAPACITY IN FIRST CYCLE (mAh) | DISCHARGE CAPACITY RETENTION RATIO (%) |
|---|---|---|---|---|---|---|---|---|---|
| | Sn (WT %) | Cu (WT %) | | Sn | $Cu_6Sn_5$ | $Cu_3Sn$ | | | |
| EXAMPLE 1 | 50 | 50 | N | ○ | ○ | ○ | 0.5 | 8.4 | 92 |
| EXAMPLE 2 | 62 | 38 | N | ○ | ○ | ○ | 0.5 | 9.4 | 84 |
| EXAMPLE 3 | 62 | 38 | Y | ○ | ○ | X | 0.5 | 9.4 | 88 |
| EXAMPLE 4 | 60 | 40 | N | ○ | ○ | ○ | 0.5 | 9.2 | 75 |
| COMPARATIVE EXAMPLE 1 | 50 | 50 | Y | X | ○ | ○ | 0.5 | 8.4 | 60 |
| COMPARATIVE EXAMPLE 2 | 60 | 40 | Y | X | ○ | X | 0.5 | 9.2 | 51 |
| COMPARATIVE EXAMPLE 9 | — | — | — | — | — | — | 1.0 | 6.2 | 95 |

TABLE 2

| | MATERIAL | | HEAT TREATMENT IN Ar GAS | PHASE INCLUDED IN ONE PARTICLE | | | RATIO OF ARTIFICIAL GRAPHITE IN ANODE MATERIAL | DISCHARGE CAPACITY IN FIRST CYCLE (mAh) | DISCHARGE CAPACITY RETENTION RATIO (%) |
|---|---|---|---|---|---|---|---|---|---|
| | Sn (WT %) | Fe (WT %) | | Sn | $FeSn_2$ | FeSn | | | |
| EXAMPLE 5 | 72 | 28 | N | ○ | ○ | ○ | 0.5 | 10.5 | 80 |
| EXAMPLE 6 | 75 | 25 | N | ○ | ○ | ○ | 0.5 | 11.0 | 76 |
| EXAMPLE 7 | 81 | 19 | N | ○ | ○ | ○ | 0.5 | 11.3 | 74 |
| EXAMPLE 8 | 83 | 17 | N | ○ | ○ | X | 0.5 | 12.0 | 70 |
| EXAMPLE 9 | 83 | 17 | Y | ○ | ○ | X | 0.5 | 12.0 | 72 |
| COMPARATIVE EXAMPLE 3 | 72 | 28 | Y | X | ○ | ○ | 0.5 | 10.5 | 44 |
| COMPARATIVE EXAMPLE 4 | 75 | 25 | Y | X | ○ | ○ | 0.5 | 11.0 | 43 |
| COMPARATIVE EXAMPLE 5 | 81 | 19 | Y | X | ○ | ○ | 0.5 | 11.3 | 43 |
| COMPARATIVE EXAMPLE 9 | — | — | — | — | — | — | 1.0 | 6.2 | 95 |

TABLE 3

| | MATERIAL | | HEAT TREATMENT IN Ar GAS | PHASE INCLUDED IN ONE PARTICLE | | | | RATIO OF ARTIFICIAL GRAPHITE IN ANODE MATERIAL | DISCHARGE CAPACITY IN FIRST CYCLE (mAh) | DISCHARGE CAPACITY RETENTION RATIO (%) |
|---|---|---|---|---|---|---|---|---|---|---|
| | Sn (WT %) | Co (WT %) | | Sn | $CoSn_2$ | CoSn | $Co_3Sn_2$ | | | |
| EXAMPLE 10 | 65 | 35 | N | ○ | ○ | ○ | ○ | 0.5 | 9.8 | 83 |
| EXAMPLE 11 | 73 | 27 | N | ○ | ○ | ○ | X | 0.5 | 10.6 | 79 |
| EXAMPLE 12 | 80 | 20 | N | ○ | ○ | X | X | 0.5 | 11.1 | 74 |
| EXAMPLE 13 | 82 | 18 | N | ○ | ○ | X | X | 0.5 | 11.5 | 73 |
| EXAMPLE 14 | 82 | 18 | Y | ○ | ○ | X | X | 0.5 | 11.5 | 75 |
| COMPARATIVE EXAMPLE 6 | 65 | 35 | Y | X | ○ | ○ | ○ | 0.5 | 9.8 | 48 |
| COMPARATIVE EXAMPLE 7 | 73 | 27 | Y | X | ○ | ○ | X | 0.5 | 10.6 | 47 |
| COMPARATIVE EXAMPLE 8 | 80 | 20 | Y | X | ○ | X | X | 0.5 | 11.1 | 42 |
| COMPARATIVE EXAMPLE 9 | — | — | — | — | — | — | — | 1.0 | 6.2 | 95 |

TABLE 4

| MATERIAL | JCPDS No. |
| --- | --- |
| Sn | 04-0673 |
| $Cu_3Sn$ | 01-1240 |
| $Cu_6Sn_5$ | 45-1488 |
| FeSn | 09-0212 |
| $FeSn_2$ | 25-0415 |
| $CoSn_2$ | 25-0256 |
| CoSn | 02-0559 |
| $So_3Sn_2$ | 27-1124 |

Next, the secondary battery using each of the obtained tin-contained materials of Examples 1 through 14 was formed. The secondary battery had the same shape as the secondary battery shown in FIG. 1. Therefore, the description will be given referring to FIG. 1, and like numerals are used to denote like components.

At first, lithium carbonate and cobalt carbonate were mixed at a molar ratio of lithium carbonate:cobalt carbonate=0.5:1, and they were sintered in air at 900° C. for 5 hours to obtain lithium cobalt complex oxide ($LiCoO_2$) which was the cathode material. Next, 91 parts by weight of the obtained lithium cobalt complex oxide, 6 parts by weight of graphite as an electronic conductor and 3 parts by weight of polyvinylidene fluoride as a binder were mixed to prepare a cathode mixture. Then, the cathode mixture was dispersed in N-methyl-2-pyrrolidone as a solvent to form cathode mixture slurry. After the cathode mixture slurry was uniformly applied to the cathode current collector 12a made of aluminum foil, and was dried, the cathode current collector 12a was stamped into a pellet with a diameter of 15.5 mm, and was compression molded by a pressing machine so as to form the cathode mixed layer 12b. Thereby, the cathode 12 was formed.

Next, the anode material which included 50 parts by weight of each of the obtained tin-containing materials of Examples 1 through 14, and 40 parts by weight of artificial graphite as an anode active material and an electronic conductor, and 10 parts by weight of polyvinylidene fluoride as a binder were mixed to prepare an anode mixture. Then, the anode mixture was dispersed in N-methyl-2-pyrrolidone as a solvent to form anode mixture slurry. After the anode mixture slurry was uniformly applied to the anode current collector 14a made of copper foil, and was dried, the anode current collector 14a was stamped into a pellet with a diameter of 15.5 mm, and was compression molded by a pressing machine so as to form the anode mixed layer 14b. Thereby, the anode 14 was formed.

Moreover, $LiPF_6$ as the lithium salt was dissolved in a solvent including 50 vol % of ethylene carbonate and 50 vol % of diethyl carbonate at a ratio of 1 mol/$dm^3$ to form the electrolyte solution. After that, the anode 14 and the separator 15 made of a porous polypropylene film were laminated in order in a central portion of the package cup 13, and the electrolyte solution was injected into the package cup 13. Then, the package can 11 containing the cathode 12 was put on the package cup 13, and the package cup 13 and the package can 11 were caulked so as to form the coin-type secondary battery shown in FIG. 1 with a diameter of 20 mm and a height of 2.5 mm.

A charge-discharge test was carried out on each of the obtained secondary batteries of Examples 1 through 14 at 20° C., and a discharge capacity in the first cycle and a discharge capacity retention ratio were determined. At that time, charge was carried out at a constant current of 10 mA until the battery voltage reached 4.2 V, and then the charge was continued at a constant voltage of 4.2 V until a current was reduced to 0.1 mA or less. On the other hand, discharge was carried out at a constant current of 10 mA until the battery voltage reached 2.5 V. The discharge capacity retention ratio was determined as a ratio of the discharge capacity in the tenth cycle to the discharge capacity in the first cycle, that is, (discharge capacity in the tenth cycle)/(discharge capacity in the first cycle)×100. The obtained results are shown in Tables 1 through 3.

As Comparative Examples 1 through 8 relative to Examples 1 through 14, the tin-containing materials were formed as in the case of Example 3, except that the mixed ratio of tin and, copper, iron or cobalt was as shown in Tables 1 through 3. When the structures of the tin-containing materials of Comparative Examples 1 through 8 were analyzed as in the case of Examples 1 through 14, it was found out that materials shown in Tables 1 through 3 coexisted in the same particle.

Further, a coin-type secondary battery using each of the tin-containing materials of Comparative Examples 1 through 8 was formed as in the case of Examples 1 through 14. Moreover, as Comparative Example 9 relative to Examples 1 through 14, a coin-type secondary battery was formed as in the case of Examples 1 through 14, except that an anode material including only artificial graphite was used. The discharge capacity in the first cycle and the discharge capacity retention ratio of the secondary batteries of Comparative Examples 1 through 9 were determined. The results are also shown in Tables 1 through 3.

It was obvious from Tables 1 through 3 that in Examples 1 through 14, the discharge capacity in the first cycle was 8.4 mAh or over, and the discharge capacity retention ratio was 70% or more, that is, both of them were superior. On the other hand, in Comparative Examples 1 through 8, although the discharge capacity in the first cycle was as high as 8.4 mAh or over, the discharge capacity retention ratio was as low as 60% or less. Moreover, in Comparative Example 9, although the discharge capacity retention ratio was as high as 95%, the discharge capacity in the first cycle was as low as 6.2 mAh. Accordingly, it was found out that when the tin-containing material including metallic tin and an intermetallic compound including tin in the same particle was used, a higher capacity and superior charge-discharge cycle characteristics could be obtained.

The present invention is described referring to the embodiment and the examples, but the invention is not limited to the above embodiment and the examples, and is variously modified. For example, in the embodiment and the examples, the case where the electrolyte solution which is a liquid electrolyte is used is described; however, instead of the electrolyte solution, any other electrolyte may be used. As the electrolyte, for example, a gel electrolyte in which a high molecular weight compound holds an electrolyte solution, a solid electrolyte having ionic conductivity, a mixture of the solid electrolyte and the electrolyte solution, or a mixture of the solid electrolyte and the gel electrolyte is cited.

For the gel electrolyte, various high molecular weight compounds which absorb the electrolyte solution to be gelled can be used. As such a high molecular weight compound, for example, a fluorine-based high molecular weight compound such as poly(vinylidene fluoride), or a copolymer of vinylidene fluoride and hexafluoropropylene, an ether-based high molecular weight compound such as poly(ethylene oxide), a cross-link including poly(ethylene oxide) or the like, or poly(acrylonitrile) is cited. More specifically, in terms of stability of oxidation-reduction, the flurorine-based high molecular weight compound is preferable.

For the solid electrolyte, for example, a solid high molecular weight electrolyte in which electrolyte salt is dispersed in a high molecular weight compound having ionic conductivity, or an inorganic solid electrolyte made of ion conducting glass, ionic crystal or the like can be used. In this case, as the high molecular weight compound, for example, an ether-based high molecular weight compound such as poly(ethylene oxide), a cross-link including poly(ethylene oxide) or the like, a ester-based high molecular weight compound such as poly(methacrylate) or the like, an acrylate-based high molecular weight compound, a mixture thereof, or any of the above high molecular weight compounds copolymerized in molecules can be used. Further, as the inorganic solid electrolyte, lithium nitride, lithium iodide or the like can be used.

In the embodiment and the examples, the case where lithium is used for electrode reaction is described; however, the invention can be applied to the case where any other alkali metal such as sodium (Na), potassium (K) or the like, alkaline-earth metal such as magnesium (Mg), calcium (Ca) or the like, any other light metal such as aluminum (Al) or the like, lithium, or an alloy thereof is used, and the same effects can be obtained.

Moreover, in the embodiment and the examples, the coin type secondary battery is specifically described; however, the invention can be applied to a secondary battery with any other shape such as a cylindrical shape, a prismatic shape, a button shape, or a shape using a package material such as a laminate film or the like. Further, the anode material according to the invention can be applied to not only the secondary batteries but also any other batteries such as primary batteries or the like.

As described above, the anode material according to the invention comprises a tin-containing material including metallic tin and an intermetallic compound including tin in the same particle, so the capacity can be increased, and the charge-discharge cycle characteristics can be improved.

Specifically, the anode material according to the invention further comprises the carbonaceous material, so higher performance can be obtained.

Moreover, in the battery according to the invention, the anode material according to the invention is used, so a higher capacity and superior charge-discharge cycle characteristics can be obtained.

Specifically, in the battery according to the invention, the cathode includes the lithium complex oxide, so a higher voltage can be generated, and the energy density can be improved.

Obviously many modifications and variations of the present invention are possible in the light of the above teachings. It is therefore to be understood that within the scope of the appended claims the invention may be practiced otherwise than as specifically described.

What is claimed is:

1. An anode material comprising:
   a tin-containing material including metallic tin, $CoSn_2$, $CoSn$, and $Co_3Sn_2$ and
   an alloy comprising lithium and at least one element selected from the group of elements consisting of boron, gallium, antimony, cadmium, silver, and hafnium, in the same particle.

2. An anode material according to claim 1, wherein the tin-containing material is produced by a method selected from the group of methods consisting of a mechanical alloying method, a gas atomization method, a water atomization method, a melt spinning method, and a method of mixing materials, and then heating the anode material in one of an inert atmosphere and a reducing atmosphere.

3. An anode material according to claim 1, further comprising:
   a carbonaceous material.

4. An anode material according to claim 3, wherein the carbonaceous material is graphite.

5. A battery comprising:
   a cathode;
   an anode; and
   an electrolyte,
   wherein the anode comprises a tin-containing material including metallic tin, $CoSn_2$, $CoSn$, and $Co_3Sn_2$ and an alloy comprising lithium and at least one element selected from the group of elements consisting of boron, gallium, antimony, cadmium, silver, and hafnium, in the same particle.

6. A battery according to claim 5, wherein the tin-containing material is produced by a method selected from the group of methods consisting of a mechanical alloying method, a gas atomization method, a water atomization method, a melt spinning method, and a method of mixing materials, and then heating the anode material in one of an inert atmosphere and a reducing atmosphere.

7. A battery according to claim 5, wherein the anode further comprises a carbonaceous material.

8. A battery according to claim 7, wherein the carbonaceous material is graphite.

9. A battery according to claim 5, wherein the cathode includes lithium complex oxide.

* * * * *